United States Patent
Tramoni et al.

(10) Patent No.: US 11,012,118 B2
(45) Date of Patent: May 18, 2021

(54) ACTIVATION OF AN NFC DEVICE

(71) Applicants: STMicroelectronics (Rousset) SAS, Rousset (FR); STMicroelectronics razvoj polprevodnikov d.o.o., Ljubljana (SI)

(72) Inventors: Alexandre Tramoni, Le Beausset (FR); Maksimiljan Stiglic, Maribor (SI); Kosta Kovacic, Orehova vas (SI)

(73) Assignees: STMICROELECTRONICS (ROUSSET) SAS, Rousset (FR); STMICROELECTRONiCS RAZVOJ POLPREVODNIKOV D.O.O., Ljubljana (SI)

( * ) Notice: Subject to any disclaimer, the term of this patent is extended or adjusted under 35 U.S.C. 154(b) by 0 days.

(21) Appl. No.: 15/989,554

(22) Filed: May 25, 2018

(65) Prior Publication Data
US 2018/0343037 A1 Nov. 29, 2018

(30) Foreign Application Priority Data

May 29, 2017 (FR) ...................................... 1754706
May 29, 2017 (FR) ...................................... 1754707

(51) Int. Cl.
H04B 5/00 (2006.01)
(52) U.S. Cl.
CPC ......... H04B 5/0037 (2013.01); H04B 5/0031 (2013.01); H04B 5/0056 (2013.01)
(58) Field of Classification Search
CPC .................................................. H04B 5/0037
See application file for complete search history.

(56) References Cited

U.S. PATENT DOCUMENTS

| | | | |
|---|---|---|---|
| 2004/0116074 A1* | 6/2004 | Fujii | G06K 7/0008 455/41.2 |
| 2011/0070825 A1* | 3/2011 | Griffin | H04W 4/80 455/41.1 |
| 2012/0178366 A1* | 7/2012 | Levy | G06K 7/10237 455/41.1 |
| 2014/0021799 A1* | 1/2014 | Sankararamalingam | H04B 5/0037 307/104 |
| 2016/0027014 A1* | 1/2016 | Spencer, II | G06Q 20/341 705/44 |
| 2016/0072556 A1 | 3/2016 | Lee et al. | |

FOREIGN PATENT DOCUMENTS

EP 1840790 A2 10/2007

OTHER PUBLICATIONS

Finkenzeller, Klaus, et al., "Battery powered tags for ISO/IEC 14443, actively emulating load modulation", ITG-Fachbericht 229, RFID SysTech 2011, May 18, 2011, XP055311620, 8 pages.

* cited by examiner

*Primary Examiner* — Hsinchun Liao
(74) *Attorney, Agent, or Firm* — Slater Matsil, LLP

(57) ABSTRACT

A near field communication (NFC) method includes activating an NFC device second device in response to a first electromagnetic field generated by a nearby NFC device. The NFC device generates a second electromagnetic field after being activated. The first NFC device can detect the second electromagnetic field and initiate a near field communication process.

20 Claims, 2 Drawing Sheets

ACTIVATION OF AN NFC DEVICE

CROSS-REFERENCE TO RELATED APPLICATIONS

This application claims priority to French Application No. 1754706, filed on May 29, 2017, and French Patent Application No. 1754707, filed on May 29, 2017, which applications are hereby incorporated herein by reference.

TECHNICAL FIELD

The present invention relates generally to electronic circuits, and, in particular embodiments, to the activation of an NFC device.

BACKGROUND

Communication systems with electromagnetic transponders are increasingly commonplace, particularly since the development of near field communication (NFC) technologies.

These systems exploit a radiofrequency electromagnetic field via a device (terminal or reader) to communicate with another device (card).

In the recent systems, one and the same NFC device can operate in card mode or in read mode (for example in the case of a near field communication between two mobile phones). It is then commonplace for the devices to be powered by batteries and for their functions and circuits to be set to standby so as not to consume energy between periods of use. The devices then have to be "woken up" when they are located within range of one another.

SUMMARY

The present invention relates generally to electronic circuits and, in particular embodiments, to electromagnetic transponders or electronic tags (TAG). For example, embodiments apply to the electronic devices that incorporate a near field communication (NFC) circuit and to the detection of the presence of such a device in the field of another device.

Embodiments of the invention reduce all or some of the drawbacks of the known techniques for detecting presence of an electronic device incorporating a near field communication circuit by another electronic device emitting an electromagnetic field.

Embodiments provide a solution avoiding the detection errors.

For example, embodiments provide a method for activating, by a first NFC device, a second NFC device. The second device generates a second field in response to an activation of the second device by a first electromagnetic field generated by the first device.

According to embodiments, when it detects the second field, the first device initiates a near field communication with the second device.

According to embodiments, the method comprises activating the first device. The first device emits the first radiofrequency electromagnetic field. The second device is activated by the first field and generates the second field. The first device detects the second field and initiates a near field communication process.

According to embodiments, the activation of the first device is periodic.

According to embodiments, the activation corresponds to an exit from a sleep mode.

Embodiments provide a near field communication device, adapted to implement the above method.

BRIEF DESCRIPTION OF THE DRAWINGS

These features and advantages, and others, will be explained in detail in the following description of particular embodiments given in a non-limiting manner in relation to the attached figures in which.

Elements that are the same have been designated by the same references in the different figures.

DETAILED DESCRIPTION OF ILLUSTRATIVE EMBODIMENTS

For clarity, only the steps and elements useful to an understanding of the embodiments which will be described have been represented and will be detailed. In particular, the generation of the radiofrequency signals and their interpretation have not been detailed, the embodiments described being compatible with the standard techniques for generating and interpreting these signals.

Unless stipulated otherwise, when reference is made to two elements connected to one another, that means directly connected with no intermediate element other than conductors, and when reference is made to two elements linked to one another, that means that these two elements may be directly linked (connected) or linked via one or more other elements.

In the following description, when reference is made to the terms "approximately", "around" and "of the order of", that means to within 10%, and preferably to within 5%.

Figure 1:
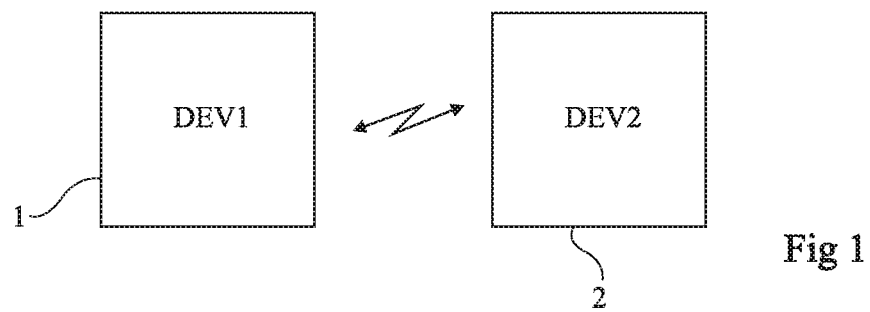
FIG. 1 is a very schematic representation in block form of an exemplary near field communication system of the type to which embodiments which will be described apply, by way of example.

FIG. 1 is a very schematic representation in block form of an example of a near field communication system of the type to which embodiments which will be described apply, by way of example.

The case of two similar electronic devices, for example two mobile phones, is presented, but everything which will be described applies more generally to any system in which a transponder picks up an electromagnetic field radiated by a reader, base terminal or terminal. To simplify, reference will be made to NFC devices to describe electronic devices incorporating near field communication circuits.

Two NFC devices 1 (NFC DEV1) and 2 (NFC DEV2) are capable of communicating by near field electromagnetic coupling. Depending on the application, for a communication, one of the devices operates in so-called reader mode while the other operates in so-called card mode, or both devices communicate in peer-to-peer (P2P) mode. Each device comprises various electronic circuits for generating a radiofrequency signal emitted using an antenna. The radiofrequency field generated by one of the devices is picked up by the other device which is located within range and which also includes an antenna.

In the applications more particularly targeted by the present description, when one NFC device is not communicating, it is switched to sleep mode in order to reduce the energy consumed. That is particularly the case for battery-powered devices.

When a device (for example, the device 1) emits an electromagnetic field to initiate a communication with another NFC device (for example the device 2), this field is picked up by this device 2 as soon as it is located in range. This field is detected by the circuits of the device 2 which, if they are on standby, are reactivated. That is reflected by a variation of the load formed by the circuits of the device 2 on the resonant field generation circuit of the device 1. In practice, the corresponding variation of phase or of amplitude of the field emitted is detected by the device 1 which then begins an NFC communication protocol with the device 2. On the device 1 side, the amplitude of the voltage at the terminals of the resonant circuit dropping below a threshold or the voltage exhibiting a phase-shift above a threshold is in practice detected.

Once the device 1 has detected the presence of the device 2 in its field, it begins a communication setup procedure, implementing emissions of requests by the device 1 and of responses by the device 2.

One difficulty lies in the fact that the variation of the amplitude of the field or of its phase on the device 1 side depends on the coupling made with the device 2. Now, the coupling factor depends on a number of parameters, including the distance between the two devices and the size of the antenna of the device 2. In some situations, although the device 2 has been woken up, the coupling is too weak for the variation of amplitude or of phase to be detected on the device 1 side, even though a communication could be set up.

Figure 2:
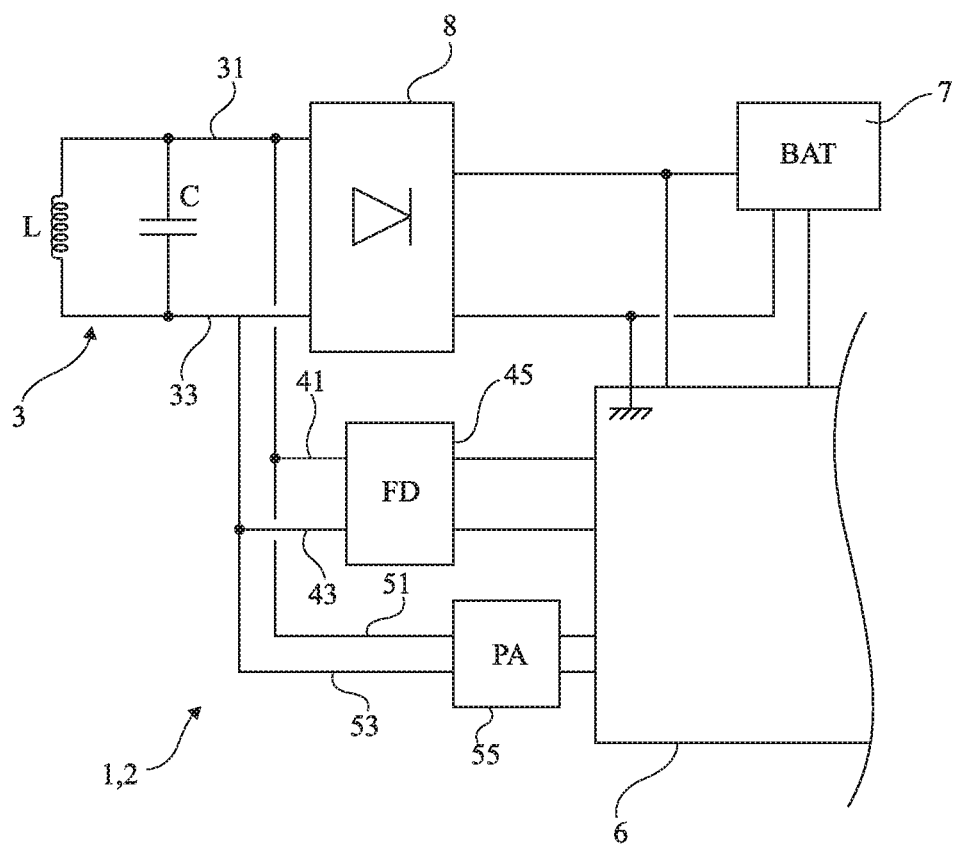
FIG. 2 is a block diagram partially illustrating an embodiment of circuits of a near field communication device.

FIG. 2 is a block diagram partially illustrating an embodiment of circuits of a near field communication device.

In a simplified manner, the device (1 or 2, FIG. 1) comprises at least one series or parallel resonant circuit 3. In the case of a parallel resonant circuit as represented, the circuit 3 comprises an antenna-forming inductor L in parallel with a capacitive element C. The terminals of the parallel association define input-output terminals 31 and 33 of the resonant circuit 3. In the example represented, the same resonant circuit 3 is used in emission and in reception. In this case, the terminals 31 and 33 are linked to input terminals 41 and 43 of a radiofrequency reception chain and to output terminals 51 and 53 of a radiofrequency emission chain. According to another embodiment, the device comprises two antennas, respectively for emission and for reception. Each transmission (emission or reception) chain generally comprises various circuits (impedance matching, switching, coupling and other such circuits) not represented between the resonant circuit 3 and radiofrequency signal processing circuits, symbolized globally by a block 6. On the reception side, the reception chain also comprises at least one field detection (FD) circuit 45. On the emission side, the emission chain comprises at least one amplifier (PA) 55.

Where appropriate, the device draws its power or recharges a battery 7 (BAT) from the electromagnetic field that it picks up. In this case, the device furthermore includes a bridge rectifier 8, the input terminals of which are connected to the terminals 31 and 33 and the output terminals of which are connected to the circuit 6 and to the battery 7. The battery 7 is furthermore connected to the circuit 6 in order to supply it with power, in particular if the device is able to operate in read mode.

According to the embodiments described, provision is made for a field to be emitted by the receiver device as soon as it is woken up by the presence of a field emitted by the emitter device. Thus, this field will be detected by the emitter device, even in case of weak coupling.

Unlike a communication in which the receiver device modulates the electromagnetic field by modifying the load that it represents on the field of the emitter, here, there is a second field emission. Here, the second field emission can be any field emission subsequent the first field emission, i.e., there can be intervening field emissions.

The second field emission makes it possible to reliably activate the two devices. In effect, in case of a coupling that is too weak for the field emitted by the receiver to be detected by the emitter device, the communication will not be able to work. However, as soon as this field can be picked up, it is considered that a communication can be initialized.

In the applications of NFC devices with low consumption placed in sleep mode, these devices periodically activate (for example every 250 milliseconds, every few seconds, etc.) their NFC circuits to emit a field for a duration (for example, of a few microseconds) that is short compared to the period between two activations, in order to detect whether another device is in range.

Figure 3:
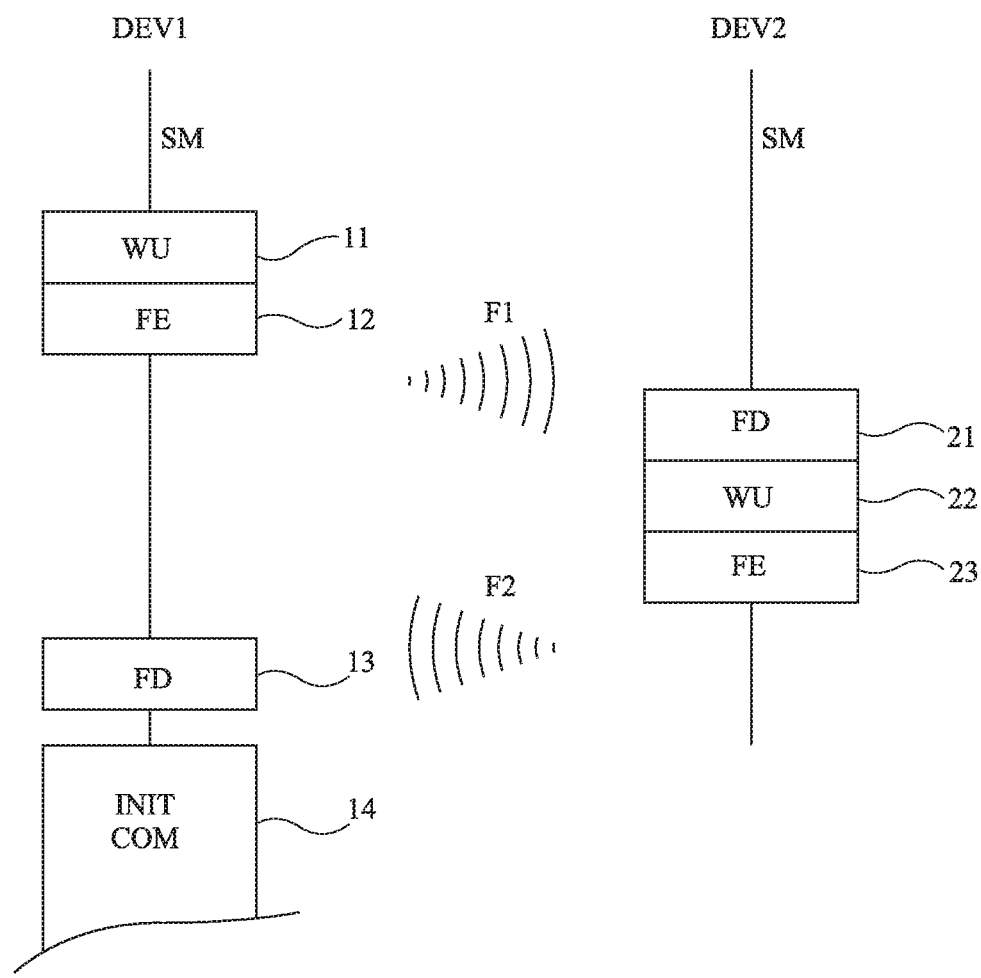
FIG. 3 represents, very schematically and in block form, steps of an embodiment of a method for activating NFC devices.

FIG. 3 represents, very schematically and in block form, steps of an embodiment of a method for activating NFC devices.

Initially, the two (or more than two) devices DEV1 and DEV2 are on standby (SM).

It is assumed that one of the devices (for example, the first DEV1) is woken up or activated (block 11, WU) to set up a communication. This activation can take various standard forms, for example, an action of a user, a periodic triggering, the reception of a communication of another type (for example using the telephone network), etc.

The device DEV1 then emits a field F1 intended to be picked up by the other device or the other devices in range.

Assuming that the second device DEV2 is in range and that the field is sufficient to activate its field detector (block 21, FD), the device DEV2 is woken up (block 22, WU). It then emits a field F2 (block 23, FE).

As the device DEV1 is in range, it picks up this field which activates its field detector (block 13, FD).

The device DEV1 may also, during its detection phase, detect the field emitted by the device DEV2. The field emitted by the device DEV2 is then picked up by the device DEV1 as a variation of phase or of amplitude. By virtue of the emission of a field (by the device DEV2), this variation is significant, even in case of weak coupling.

Lastly, the device DEV1 initializes a communication (block 14, INIT COM) in the usual way.

One advantage is that, even in the case of coupling that is too weak to trigger the standard detector of the device DEV1 by detection of a variation of amplitude or of phase of the field that it emits, the devices can begin a communication.

The method described above can be executed instead of or in addition to the standard method whereby the activation of the circuits of the receiver device DEV2 modifies the load that it represents on the field of the emitter DEV1.

One advantage of the embodiments described is that they do not modify the communication protocols between the devices. An activation phase is simply inserted before initiating a communication. Thus, the solutions described are compatible with the standard systems.

Another advantage is that the implementation of the embodiments described does not require any material modification of the devices. In effect, the hardware functions that exist in the devices are used. Thus, according to one embodiment, the implementation of the embodiments described in existing devices requires only a software update in order to incorporate the steps of the method for activating the devices. As a variant, the embodiments described can be implemented by a hardware solution, for example by a state machine (in hard wired logic). That generally allows for a faster execution and lower consumption.

Various embodiments have been described. Various modifications will become apparent to a person skilled in the art. In particular, the choice of the duration of emission of the field can vary from one application to another. Furthermore, practical implementation of the embodiments which have been described is within the scope of a person skilled in the art by using the functional indications given above.

What is claimed is:

1. A near field communication (NFC) method comprising:
    detecting, by an NFC device, a first electromagnetic field, the first electromagnetic field emitted by a nearby NFC device in response to an activation of the nearby NFC device, the first electromagnetic field being emitted to trigger an initiating of a near field communication by the nearby NFC device with the NFC device;
    emitting, by the NFC device, a second electromagnetic field in response to the detecting of the first electromagnetic field, the second electromagnetic field emitted before the near field communication; and
    receiving, by the NFC device, the near field communication from the nearby NFC device, the near field communication initiated by the nearby NFC device in response to detecting the second electromagnetic field.

2. The method according to claim 1, further comprising communicating, by the NFC device, with the nearby NFC device using the near field communication.

3. The method according to claim 2, further comprising:
    detecting, by the nearby NFC device, the second electromagnetic field; and
    initiating, by the nearby NFC device, the near field communication with the NFC device.

4. The method according to claim 1, wherein the method further comprises exiting, by each of the nearby NFC device and the NFC device, from a corresponding sleep mode.

5. The method according to claim 1, further comprising initiating, by the nearby NFC device, the near field communication with the NFC device after the nearby NFC device detects the second electromagnetic field.

6. The method according to claim 1, further comprising activating the nearby NFC device.

7. The method according to claim 6, wherein activating the nearby NFC device comprises activating the nearby NFC device periodically.

8. A near field communication (NFC) method comprising:
    activating a first NFC device;
    emitting, by the first NFC device, a first electromagnetic field to trigger an initiating of a near field communication in response to activating the first NFC device;
    activating a second NFC device in response to detecting, by the second NFC device, the first electromagnetic field;
    emitting, by the second NFC device, a second electromagnetic field after the activating the second NFC device, the second electromagnetic field emitted before the near field communication; and
    initiating, by the first NFC device, the near field communication in response to detecting, by the first NFC device, the second electromagnetic field.

9. The method according to claim 8, wherein activating the first NFC device comprises activating the first NFC device periodically.

10. The method according to claim 8, wherein the activating the first NFC device comprises exiting from a sleep mode.

11. The method according to claim 8, wherein the activating the second NFC device comprises exiting from a sleep mode.

12. A near field communication (NFC) device comprising:
    a resonant circuit;
    a radio frequency emission circuit coupled to the resonant circuit;
    a radio frequency reception circuit coupled to the resonant circuit;
    a power circuit coupled to the resonant circuit; and
    a signal processing circuit configured to:
        detect a first electromagnetic field emitted by a nearby NFC device in response to an activation of the nearby NFC device, the first electromagnetic field used to trigger an initiating of a near field communication by the nearby NFC device with the NFC device;
        emit a second electromagnetic field in response to detecting of the first electromagnetic field, the second electromagnetic field emitted before the near field communication; and
        receive the near field communication from the nearby NFC device in response to detecting the second electromagnetic field.

13. The NFC device according to claim 12, wherein the resonant circuit comprises a parallel resonant circuit including an antenna-forming inductor L in parallel with a capacitive element.

14. The NFC device according to claim 12, wherein the resonant circuit includes a single antenna for emission and reception.

15. The NFC device according to claim 12, wherein the resonant circuit includes a first antenna for emission and a second antenna for reception.

16. The NFC device according to claim 12, the power circuit is charged by a received electromagnetic field.

17. The NFC device according to claim 12, wherein the power circuit comprises a battery.

18. The NFC device according to claim 12, further comprising a bridge rectifier coupled between the resonant circuit and the power circuit.

19. The NFC device according to claim 12, wherein the NFC device is part of a mobile telephone.

20. The NFC device according to claim 12, wherein the signal processing circuit is further configured to activate the NFC device in response to an action of a user or a reception of a non-NFC communication.

* * * * *